(12) United States Patent
Huber et al.

(10) Patent No.: US 12,363,741 B2
(45) Date of Patent: Jul. 15, 2025

(54) ALLOCATING RADIO RESOURCES TO IDLE USER EQUIPMENT THAT WAS PREDICTED TO TRANSITION TO ACTIVE MODE

(71) Applicants: AT&T INTELLECTUAL PROPERTY I, L.P., Atlanta, GA (US); AT&T INTELLECTUAL PROPERTY II, L.P., Atlanta, GA (US); AT&T TECHNICAL SERVICES COMPANY, INC., Vienna, VA (US); AT&T Mobility II LLC, Atlanta, GA (US)

(72) Inventors: Kurt Huber, Ashburn, VA (US); Thomas Henderson, Alpharetta, GA (US); Daniel Vivanco, Ashburn, VA (US); Julius Fodje, Alpharetta, GA (US)

(73) Assignees: AT&T Intellectual Property I, L.P., Atlanta, GA (US); AT&T Intellectual Property II, L.P., Atlanta, GA (US); AT&T Technical Services Company, Inc., Vienna, VA (US); AT&T Mobility II LLC, Atlanta, GA (US)

(*) Notice: Subject to any disclaimer, the term of this patent is extended or adjusted under 35 U.S.C. 154(b) by 489 days.

(21) Appl. No.: 17/829,051

(22) Filed: May 31, 2022

(65) Prior Publication Data
US 2023/0389116 A1 Nov. 30, 2023

(51) Int. Cl.
*H04W 72/51* (2023.01)
*H04W 24/02* (2009.01)
(Continued)

(52) U.S. Cl.
CPC ......... *H04W 72/51* (2023.01); *H04W 72/046* (2013.01); *H04W 72/56* (2023.01); *H04W 24/02* (2013.01)

(58) Field of Classification Search
CPC ... H04W 72/51; H04W 72/56; H04W 72/046; H04W 24/02
See application file for complete search history.

(56) References Cited

U.S. PATENT DOCUMENTS

| | | | | |
|---|---|---|---|---|
| 2016/0150475 | A1* | 5/2016 | Rune | H04W 52/0216 370/311 |
| 2019/0357298 | A1* | 11/2019 | Li | H04W 24/02 |
| 2023/0247655 | A1* | 8/2023 | Ly | H04W 72/1268 370/329 |

* cited by examiner

*Primary Examiner* — Kevin C. Harper
*Assistant Examiner* — Salma Ayad

(57) ABSTRACT

The technologies described herein are generally directed to providing radio resources to facilitate a predicted transition to active mode by idle user equipment in a fifth generation (5G) network or other next generation networks. An example method can include predicting that a user equipment of a group of user equipment in an idle mode will transition to an active mode after passage of a time duration, starting from the predicting, that is lower than a time threshold. The method can further include identifying base station equipment that is able to provide coverage to the user equipment during the passage of the time duration before the user equipment transitions to the active mode. Further, the method can include prioritizing allocation of, within the group of user equipment, an antenna resource of the base station equipment to provide the coverage to facilitate an active mode connection by the user equipment to the base station equipment.

20 Claims, 10 Drawing Sheets

(51) Int. Cl.
*H04W 72/044* (2023.01)
*H04W 72/56* (2023.01)

500

MOBILITY UPDATE MESSAGE ADDENDUM 510

- FREQUENCY OF SIGNAL IDENTIFIED 520A
- POWER LEVEL OF SIGNAL IDENTIFIED 520B
- UE CALCULATED PATHLOSS 520C
- LOCATION OF UE AT SAMPLE COLLECTION 520D
- CURRENT LOCATION 520E
- EFFECTIVE ISOTROPIC RADIATED POWER (EIRP) 520F
- EVOLVED UNIVERSAL TERRESTRIAL RADIO ACCESS NETWORK (E-UTRAN) CELL GLOBAL IDENTIFIER (ECGI) OF CELL 520G
- PHYSICAL CELL IDENTIFIER (PCI) 520H
- CURRENT FREQUENCY OF CARRIER MEASURED 520I
- REFERENCE SIGNAL RECEIVED POWER (RSRP) OF SERVING CELL, BEAM ID 520J
- IDLE CHANNEL MEASUREMENTS FROM THE PHONE 520K
- POWER ALLOCATION SETTING OF UE 520L
- MODEL OF UE 520M

FIG. 5

ALLOCATING RADIO RESOURCES TO IDLE USER EQUIPMENT THAT WAS PREDICTED TO TRANSITION TO ACTIVE MODE

TECHNICAL FIELD

The subject application is related to different approaches to handling communication in networked computer systems and, for example, to providing radio resources to facilitate a predicted transition to active mode by idle user equipment, e.g., determining a likelihood that network equipment in an idle state are going to transition to an active mode, to improve network connections.

BACKGROUND

As demands for fast, high-quality wide area network connections have increased, wireless providers have implemented many new technologies, each having advantages and drawbacks over traditional approaches. New, shorter wavelength frequency bands can provide dramatically faster broadband connections to mobile devices, but because these bands can be blocked easier and have narrower beams, positioning them to offer service to user devices has been challenging.

In addition, because of high-speed connections, some users have become more demanding in the speeds of different traditional network events, the rapid establishment of connections. Even when measures are implemented to improve performance in different areas, limited radio resources can act to limit the amount performance enhancement that can be provided at a given time. In some circumstances, performance enhancements can be achieved by utilizing existing network messaging for different purposes.

BRIEF DESCRIPTION OF THE DRAWINGS

The technology described herein is illustrated by way of example and not limited in the accompanying figures in which like reference numerals indicate similar elements and in which:

FIG. 5 is a diagram of a non-limiting example addendum to administrative messages that can be used to allocate and direct radio resources to facilitate a predicted transition to active mode by idle user equipment, in accordance with one or more embodiments.

DETAILED DESCRIPTION

Generally speaking, one or more embodiments can predict a transition to active mode by idle user equipment and use this prediction to improve connectivity for the user equipment. In addition, one or more embodiments described herein can be directed towards a multi-connectivity framework that supports the operation of new radio (NR, sometimes referred to as 5G). As will be understood, one or more embodiments can support control and mobility functionality on cellular links (e.g., long term evolution (LTE) or NR). One or more embodiments can provide benefits including, system robustness, reduced overhead, and global resource management.

It should be understood that any of the examples and terms used herein are non-limiting. For instance, while examples are generally directed to non-standalone operation where the NR backhaul links are operating on millimeter wave (mmWave) bands and the control plane links are operating on sub-6 GHz long term evolution (LTE) bands, it should be understood that it is straightforward to extend the technology described herein to scenarios in which the sub-6 GHz anchor carrier providing control plane functionality could also be based on NR. As such, any of the examples herein are non-limiting examples, any of the embodiments, aspects, concepts, structures, functionalities, or examples described herein are non-limiting, and the technology may be used in various ways that provide benefits and advantages in radio communications in general.

In some embodiments the non-limiting terms "signal propagation equipment" or simply "propagation equipment," "radio network node" or simply "network node," "radio network device," "network device," and access elements can be used herein. These terms may be used interchangeably, and refer to any type of network node that can serve user equipment and/or be connected to other network node or network element or any radio node from where user equipment can receive a signal. Examples of radio network node include, but are not limited to, base stations (BS), multi-standard radio (MSR) nodes such as MSR BS, gNodeB, eNode B, network controllers, radio network controllers (RNC), base station controllers (BSC), relay, donor node controlling relay, base transceiver stations (BTS), access points (AP), transmission points, transmission nodes, remote radio units (RRU) (also termed radio units herein), remote ratio heads (RRH), and nodes in distributed antenna system (DAS). Additional types of nodes are also discussed with embodiments below, e.g., donor node equipment and relay node equipment, an example use of these being in a network with an integrated access backhaul network topology.

Figure 10:
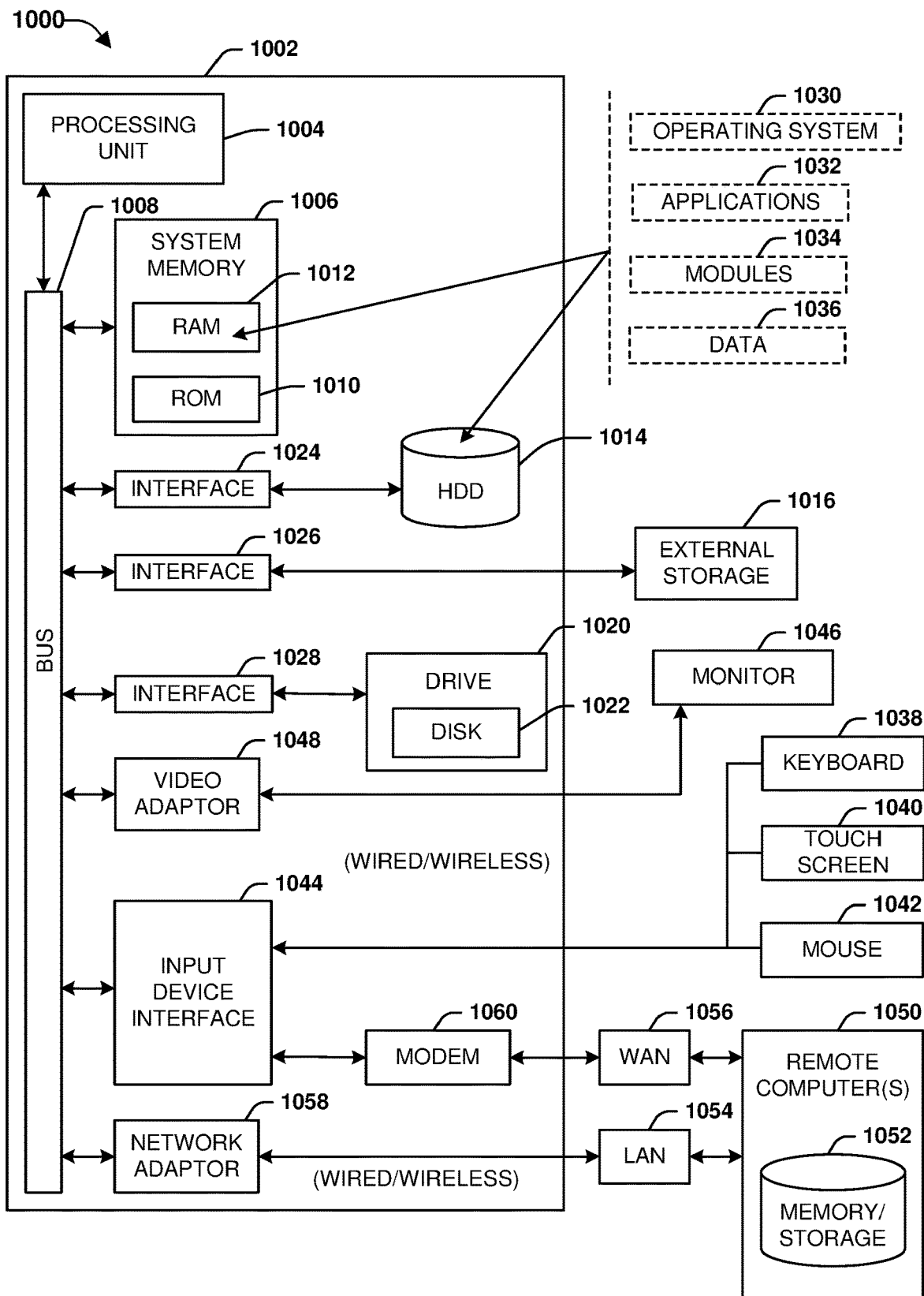
FIG. 10 provides additional context for various embodiments described herein, intended to provide a brief, general description of a suitable operating environment in which the various embodiments of the embodiment described herein can be implemented.

In some embodiments, the non-limiting term user equipment (UE) is used. This term can refer to any type of wireless device that can communicate with a radio network node in a cellular or mobile communication system. Examples of UEs include, but are not limited to, a target device, device to device (D2D) user equipment, machine type user equipment, user equipment capable of machine to machine (M2M) communication, PDAs, tablets, mobile terminals, smart phones, laptop embedded equipped (LEE), laptop mounted equipment (LME), USB dongles, and other equipment that can have similar connectivity. Example UEs are described in additional detail with FIGS. 10 and 11 below. Some embodiments are described in particular for 5G new radio systems. The embodiments are however applicable to any radio access technology (RAT) or multi-RAT system where the UEs operate using multiple carriers, e.g., LTE. Some embodiments are described in particular for 5G new radio systems. The embodiments are however applicable to any RAT or multi-RAT system where the UEs operate using multiple carriers, e.g., LTE.

The computer processing systems, computer-implemented methods, apparatus and/or computer program products described herein employ hardware and/or software to solve problems that are highly technical in nature (e.g., estimating location of a UE from signal propagation information and allocating antenna resources), that are not abstract and cannot be performed as a set of mental acts by a human. For example, a human, or even a plurality of humans, cannot efficiently predict a location of a user equipment and rapidly direct multiple signals thereto (which generally cannot be performed manually by a human), with the same level of accuracy and/or efficiency as the various embodiments described herein.

Aspects of the subject disclosure will now be described more fully hereinafter with reference to the accompanying drawings in which example components, graphs and selected operations are shown. In the following description, for purposes of explanation, numerous specific details are set forth in order to provide a thorough understanding of the various embodiments. For example, some embodiments described can provide radio resources to facilitate a predicted transition to active mode by idle user equipment.

As is understood by one having skill in the relevant art(s), given the description herein, lack of beam-steering at idle mode can cause UE attach failures and delays, e.g., when the current network footprint does not encompass idle user equipment, there can be a delay (or failure) when the idle UE attempts to connect to the network, otherwise termed herein, go from idle mode to active mode, to be activated, to become persistently active, and other similar terms. As described herein, one or more embodiments can periodically collect information (e.g., regarding location and signal propagation/interference) then use preemptive actions to improve the network footprint to cover a selected number of idle UEs, e.g., selected based on priority and available resources. As described below, preemptive (e.g., before a connection is requested for the UE) actions can include the creation and direction of new energy beams and the adjustment of existing energy beams, to change the network footprint to cover the selected idle UEs. Different examples that describe these aspects are included with the description of FIGS. 1-11 below.

It should be noted that the subject disclosure may be embodied in many different forms and should not be construed as limited to this example or other examples set forth herein. It should be further noted that, although a tracking area update message is frequently used for illustration herein, one having skill in the relevant art(s), given the discussion herein, would appreciate how to use different types of messages can be used for modifications described herein, e.g., to include the administrative information for functions described herein. One should further note that, although directional 5G signals are used for many of the examples herein, many of the different embodiments described and suggested by the disclosure herein, can provide beneficial results when applied to previous generations of wireless communication.

Figure 1:
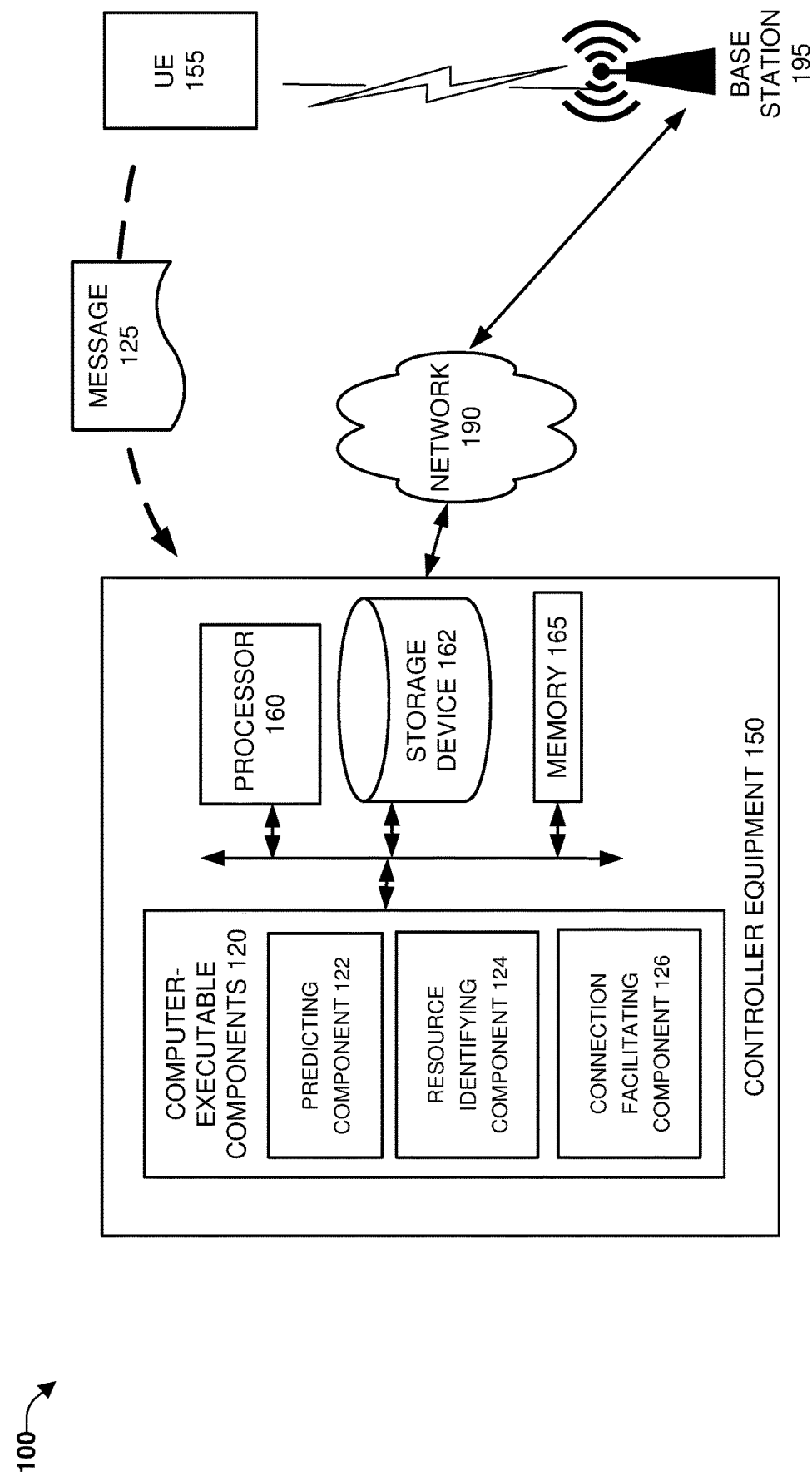
FIG. 1 is an architecture diagram of an example system that can facilitate providing radio resources to facilitate a predicted transition to active mode by idle user equipment, in accordance with one or more embodiments.

FIG. 1 is an architecture diagram of an example system 100 that can predict a transition to active mode by idle user equipment to perform different activities including providing radio resources to facilitate the transition, in accordance with one or more embodiments. For purposes of brevity, description of like elements and/or processes employed in other embodiments is omitted.

As depicted, system 100 can include controller equipment 150 communicatively coupled via network 190 to base station 195, which is wirelessly connected to UE 155. Based on different conditions discussed herein, UE 155 can communicate a message 125 via base station 195 and network 190 to controller equipment 150. In one or more embodiments, controller equipment 150 can include computer executable components 120, processor 160, storage device 162, and memory 165. A discussed further below, computer executable components 120 can include predicting component 122, resource identifying component 124, connection facilitating component 126, and other components described or suggested by different embodiments described herein, that can improve the operation of system 100. In a non-limiting example, functions of controller equipment 150 can be implemented at a distributed or central node global control located on the network, e.g., a mobile edge computing (MEC) of a self-organized network (SON), or a RAN Intelligent Controller (RIC).

In one or more embodiments, base station 195 and other base station elements described with FIGS. 2-5 below, can be a fifth or later generation radio network nodes, as described above. One having skill in the relevant art(s), given the discussion herein, understands that 5G networks that may use waveforms that split the bandwidth into several sub-bands, with different types of services being accommodated in different sub-bands with complementary waveform and numerology, e.g., leading to improved spectrum utilization for 5G networks. In some implementations, base station 195 can use the mmWave spectrum, with the millimeter waves have shorter wavelengths relative to other communications waves, and thus potentially experiencing higher degrees of path loss, penetration loss, and fading than larger wavelength signals.

In one or more embodiments, the shorter wavelength at mmWave frequencies can also enable more antennas to be located in the same physical dimension, which can enable large-scale spatial multiplexing and highly directional beamforming, e.g., with phased antenna arrays it is possible to create and control the shape and direction of the signal beam from multiple antennas based on the antenna spacing and the phase of signal from each antenna element in the array. In some circumstances, the more radiating elements that make up the antenna, the narrower the beam. Although many of the applications and examples discussed herein relate to fifth or later generation radio network nodes, one having skill in the relevant art(s), given the description herein, understands that earlier generation radio network nodes also can have radio directing capabilities that can be used to implement the concepts described herein.

Further to the above, it should be appreciated that these components, as well as aspects of the embodiments of the subject disclosure depicted in this figure and various figures disclosed herein, are for illustration only, and as such, the architecture of such embodiments are not limited to the systems, devices, and/or components depicted therein. For example, in some embodiments, controller equipment 150 can further comprise various computer and/or computing-based elements described herein with reference to mobile handset 1000 of FIG. 10, and operating environment 1100 of FIG. 11. For example, one or more of the different functions of network equipment can be divided among various equipment, including, but not limited to, including equipment at a central node global control located on the core Network, e.g., mobile edge computing (MEC), self-organized networks (SON), or RAN intelligent controller (RIC) network equipment.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure.

According to multiple embodiments, storage device 162 can include, but is not limited to, RAM, ROM, EEPROM, flash memory or other memory technology, solid state drive (SSD) or other solid-state storage technology, Compact Disk Read Only Memory (CD ROM), digital video disk (DVD), blu-ray disk, or other optical disk storage, magnetic cassettes, magnetic tape, magnetic disk storage or other magnetic storage devices, or any other medium which can be used to store the desired information and which can be accessed by the computer.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a system on a chip (SOC), an array processor, a vector processor, and other types of processors. Further examples of processor 160 are described below with reference to processing unit 1104 of FIG. 11. Such examples of processor 160 can be employed to implement any embodiments of the subject disclosure.

In one or more embodiments, computer executable components 120 can be used in connection with implementing one or more of the systems, devices, components, and/or computer-implemented operations shown and described in connection with FIG. 1 or other figures disclosed herein. For example, in one or more embodiments, computer executable components 120 can include instructions that, when executed by processor 160, can facilitate performance of operations defining predicting component 122.

As discussed with FIGS. 2-5 below, predicting component 122 can, in accordance with one or more embodiments, predict that a user equipment in an idle mode will transition to an active mode after passage of a time duration, starting from the predicting, that is lower than a time threshold. For example, one or more embodiments of controller equipment 150 can predict that UE 155 in an idle mode will transition to an active mode after passage of a time duration, starting from the predicting, that is lower than a time threshold.

Further, in another example, in one or more embodiments, computer executable components 120 can include instructions that, when executed by processor 160, can facilitate performance of operations defining resource identifying component 124. As discussed with FIGS. 3-4 below, resource identifying component 124 can, in accordance with one or more embodiments, identify base station equipment that is able to provide coverage to the user equipment during the passage of the time duration before the user equipment transitions to the active mode. For example, one or more embodiments can identify base station 195 as a base station that can provide coverage to the UE 155 during the passage of the time duration before the user equipment transitions to the active mode.

In yet another example, computer executable components 120 can include instructions that, when executed by processor 160, can facilitate performance of operations defining connection facilitating component 126. As discussed herein, connection facilitating component 126 can, before the time that the user equipment is predicted to initiate the transition to the active mode, allocate an antenna resource of the base station equipment to provide the coverage to facilitate the transition to the active mode. For example, in one or more embodiments, controller equipment 150 can, before the time that the UE 155 is predicted to initiate the transition to the active mode, allocate an antenna resource of the base station 195 to provide the coverage to facilitate the transition to the active mode.

It is appreciated by one having skill in the relevant art(s), given the description herein, that the time to initiate the transition to the active mode can vary depending upon a variety of implementation and operation specific factors, e.g., including, but not limited to, congestion of the location, resources applied to establishing connections generally and time of day and/or year.

Figure 2:
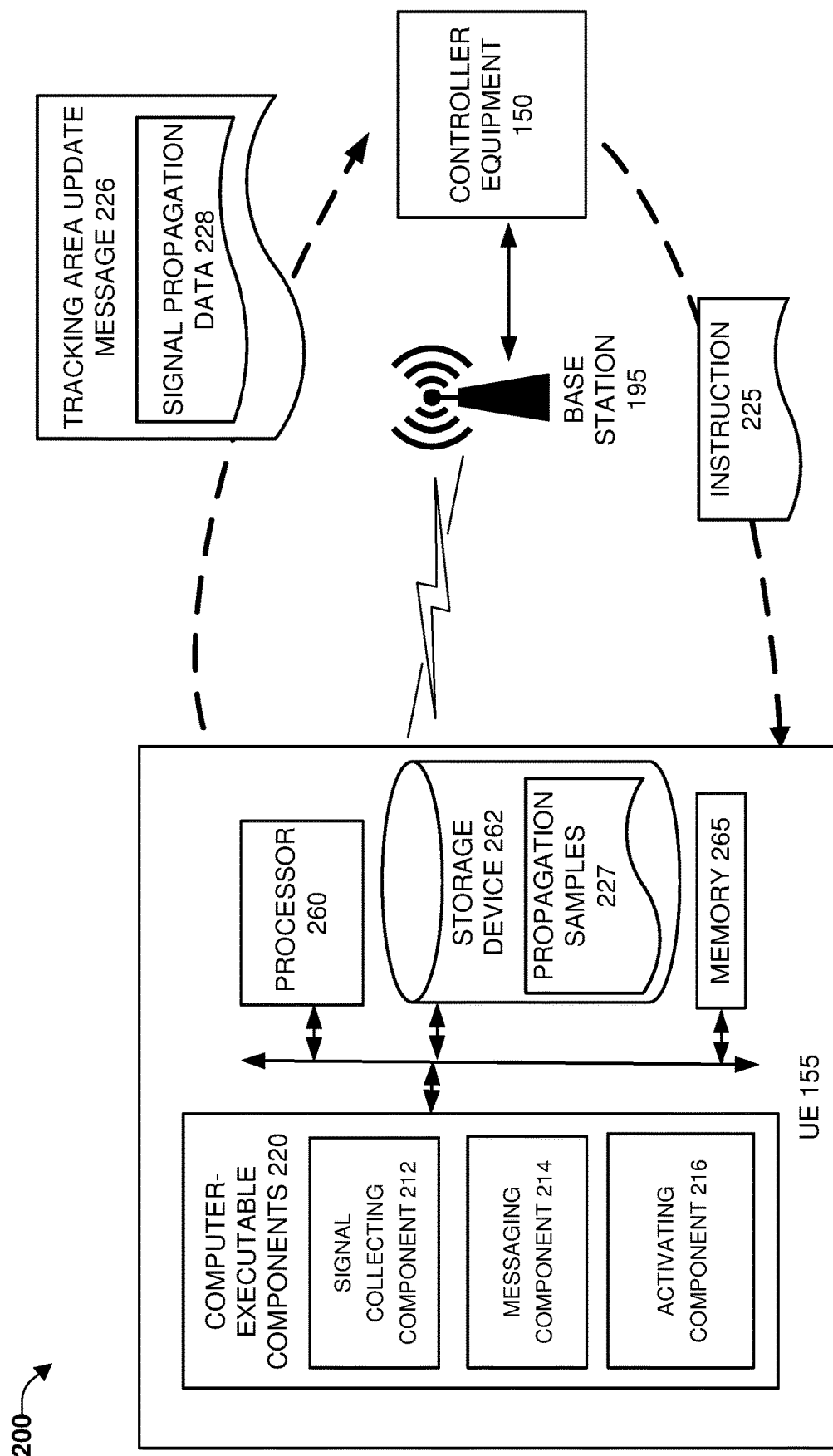
FIG. 2 is a diagram of a non-limiting example system that can facilitate utilizing provided radio resources to facilitate a transition to an active mode, in accordance with one or more embodiments.

FIG. 2 is a diagram of a non-limiting example system 200 that can facilitate utilizing provided radio resources to facilitate a transition to an active mode, in accordance with one or more embodiments. For purposes of brevity, description of like elements and/or processes employed in other embodiments is omitted.

Figure 3:
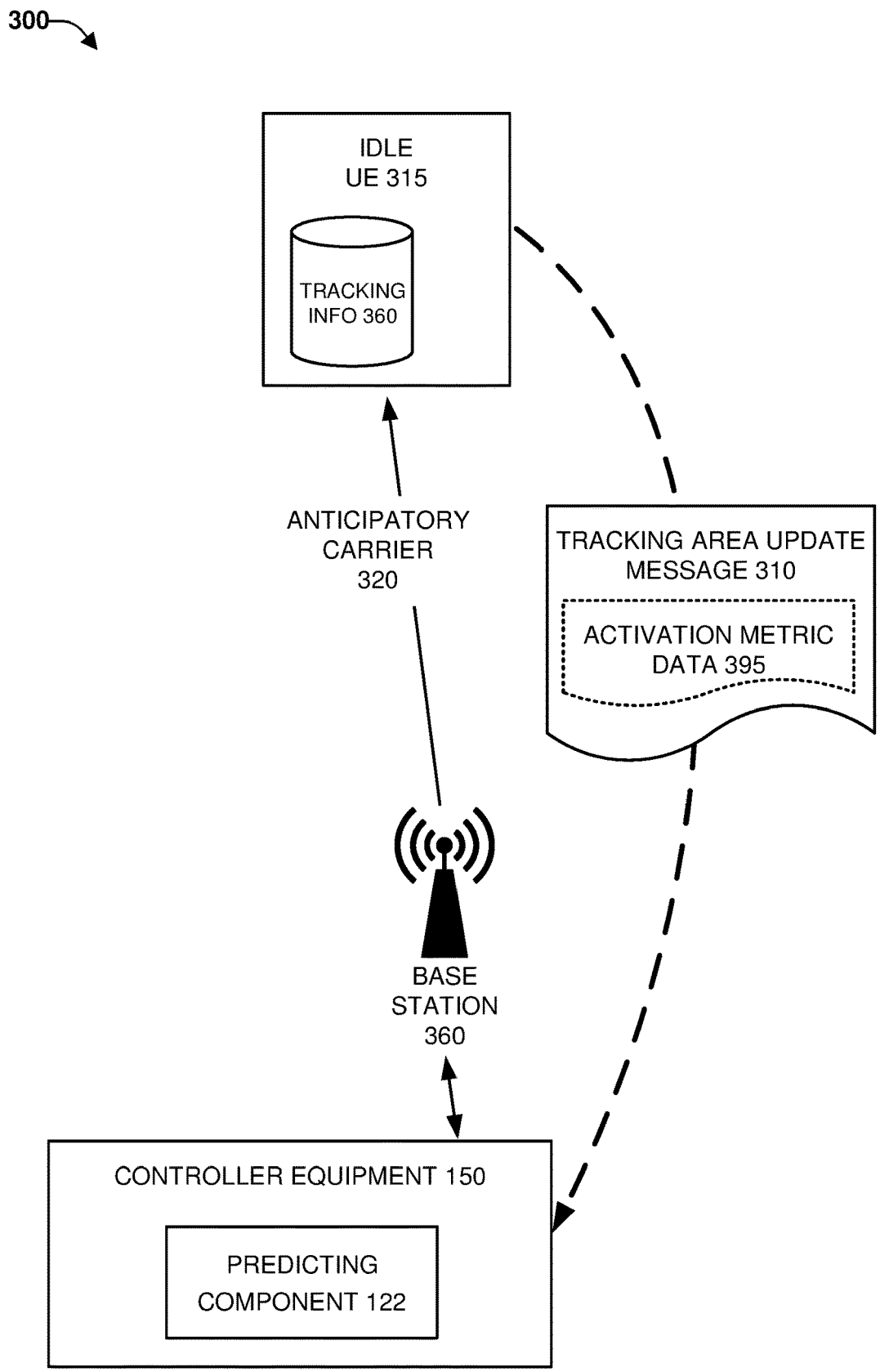
FIG. 3 is a diagram of a non-limiting example system that can facilitate preemptively allocating radio resources to facilitate a transition to active mode by idle user equipment, in accordance with one or more embodiments.

As depicted, system 200 can include controller equipment 150 communicatively coupled to UE 155 via base station 195 through network 190. Based on different conditions discussed herein, UE 155 can communicate the depicted tracking area update message 226 via base station 195 and network 190 to controller equipment 150. As discussed further below, to facilitate different embodiments discussed herein, tracking area update message 226 can be modified by one or more embodiments to include additional information elements, e.g., signal propagation data 228. As depicted in FIG. 3, controller equipment 150 can send instruction 225 to UE to implement many of the messaging functions described herein. Example instructions are discussed below.

In one or more embodiments, UE 155 can include computer executable components 220, processor 260, storage device 262 with propagation samples 227, and memory 265.

In system 200, computer executable components 220 can include signal collecting component 212, messaging component 214, activating component 216, and other components described or suggested by different embodiments described herein that can improve the operation of system 200. For example, in some embodiments, UE 155 can further comprise various computer and/or computing-based elements described herein with reference to mobile handset 1000 of FIG. 10 and operating environment 1100 described with FIG. 11.

For example, in one or more embodiments, computer executable components 220 can be used in connection with implementing one or more of the systems, devices, components, and/or computer-implemented operations shown and described in connection with FIG. 2 or other figures disclosed herein. For example, in one or more embodiments, computer executable components 220 can include instructions that, when executed by processor 260, can facilitate performance of operations defining signal collecting component 212. As discussed with FIGS. 3-6 below, in one or more embodiments, signal collecting component 212 can collect, during an idle state, signal propagation information applicable to a location.

One approach that can be used by one or more embodiments, is to generate a specific message for communicating information, e.g., radio resource messages can be generated by a UE in response to a request from network administration processes for particular information, handover messages can be generated by the UE based on events such as a diminishing signal strength, and mobility messages can be generated by the UE to register a broad change in location from one tracking area to another.

Alternatively, because UEs already communicate different types of information to network administration processes at different times, to reduce the administrative overhead of implementing one or more embodiments, collected signal and location information can be added as a new part of an existing type of message 125. To implement this 'piggyback' approach, UEs can be configured, e.g., by instruction 225 instructing messaging component 214, to modify standard messages to further include additional information useful for one or more embodiments, e.g., UE global positioning system (GPS) location and ambient signal information. For example, in one or more embodiments during the regular generation and sending of an existing network administration message (e.g., a tracking area update message, discussed below), the information generated by one or more embodiments can be added to the existing message, e.g., with the use of existing unused data fields or by repurposing existing data fields, e.g., as shown with the discussion of FIG. 6 below.

An example general type of message that can be used by one or more embodiments described herein is an idle message, e.g., like the tracking area update message, messages that can be generated by the UE during a time when the UE is not actively wirelessly communicating with the network in a call or exchanging mobile data. In one or more embodiments, idle messages can be generated based on a UE actively collecting information even though the UE is in an idle state. In one or more embodiments, for some idle messaging the collected information can be collected stored before being used to generate an idle message.

Generally speaking, tracking area updates are messages sent by a UE to the network that can be used to inform the network when the UE an idle state of communication mode moves from one tracking area to another, e.g., often termed mobility messages because they can facilitate an idle UE being located by a paging message for establishment of an active connection, even if it changes tracking areas while idle. In some implementations, a tracking area update message can also be generated and sent by a UE at a particular time interval, with this interval potentially being changed as described below by one or more embodiments.

It is appreciated by one having skill in the relevant art(s) that when an idle UE 155 detects that is has moved from one tracking area to another, the UE can subsequently transmit a tracking area update message by briefly transitioning out of the idle state of communications to receive the signals that can indicate the tracking area change and to communicate the update message to network administration processes. In addition, the idle state of communications can be used by the UE to reduce power consumption from communications processes but does not mean that the UE is not performing signal sampling and processing operations.

For these tracking area update examples, it should be noted that, in many circumstances, a tracking area can refer to a collection of radio cells that can vary in size based on terrain and reception characteristics. Because of this, a tracking area can vary in size up to being hundreds of square kilometers, e.g., a tracking area update does not generally provide a granular indication of the location of a UE, as can be provided by global navigation satellite systems (GNSS). Thus, while unmodified tracking area update messages can be described as facilitating a tracking of location by controller equipment 150 within a broad area, this tracking is generally not sufficient to allocate antenna resources for the types of functions (e.g., accelerated connections to mode transitioning UEs) described with some embodiments herein.

In addition to modifying an existing messaging procedure by adding (potentially unrelated) information to message 125, one or more embodiments can alter procedures by which the existing messages are sent. For example, as noted above, messages can be sent based on different events, e.g., based on a request, based on a change in signal strength, based on a change to a different tracking area, or at particular intervals. For one or more embodiments, to facilitate achieving the goals of the newly generated and sent information, the triggering events for sending the tracking area update message can be changed.

With respect to the message triggering events, it should be noted that one or more embodiments can beneficially alter the conditions to facilitate use of the appended information, while preserving the original function of the altered message 125. For example, because the tracking area update message is triggered to be sent at a particular interval, in one or more embodiments, this interval can be reduced, e.g., to establish an increased granularity for the existing messaging because, for example, the signal and GPS location data described herein can be more useful if received more frequently by controller equipment 150. In one or more embodiments, the extra processing and battery overhead for the UE from the increased frequency of sending a tracking area update can be compared to the utility of the extra information provided for network administration.

In other example embodiments, computer executable components 220 can include instructions that, when executed by processor 260, can facilitate performance of operations defining, messaging component 214. Messaging component 214 can, in accordance with one or more embodiments, transmit a location update message to second network equipment (e.g., base station 195, wherein the location update message comprises the signal propagation information and the location. Example types of signal and location data that can be collected, along with the uses for which one or more embodiments can apply the collected data, as described with FIGS. 3-6 below. One approach to collecting signal information by UE 155 is by using idle channel measurements from the phone from system information block (SIB) messages as well as master information block (MIB) messages In another example, in one or more embodiments, computer executable components 220 can include instructions that, when executed by processor 260, can facilitate performance of operations defining, activating component 216. In one or more embodiments, activating component 216 can commence establishment of an active state connection with base station 195, wherein, before commencing establishment of the active state connection, based on the location update message, base station 195 provided signal resources to UE 155 to facilitate the establishment of the active state connection.

FIG. 3 is a diagram of a non-limiting example system 300 that can predict a transition to active mode by idle user equipment so as to preemptively allocate radio resources for the transition, in accordance with one or more embodiments. As depicted, system 300 can include controller equipment 150 with predicting component 122, idle UE 315, and base station 360, with these elements having characteristics similar to the above discussed elements of similar and the same names. Upon particular conditions, idle UE 315 can send tracking area update message 310 (or another message, based on different implementations), and this message can be modified to include activation metric data 395, this data being described in further detail below. Base station 360 is depicted as providing a anticipatory carrier 320 in anticipation of idle UE 315 transitioning into an active, persistently connected mode, e.g., in a voice call, an exchange of data, etc.

It should be noted that the examples of FIGS. 1-2 are directed to examples with a single idle UE 315. With FIGS. 3-5, additional aspects of some embodiments are described where different approaches to the provision of anticipatory carrier 320 are discussed where scarce antenna resources can be allocated among eligible user equipment to promote better overall network outcomes.

In an example implementation, one or more embodiments of controller equipment 150 can use predicting component 122 to predict, with threshold probability that the idle UE 315 is going to transition to an active mode after passage of a time duration. Based on this prediction and the time duration estimated different administrative actions can be performed by controller equipment 150 and other network equipment, e.g., if the starting time is lower than a time threshold. Administrative actions that can be performed in response to the prediction include, but are not limited to, selecting idle UEs 315 for the provision of anticipatory carrier 320 based on a likelihood that idle UE 315 will transition to active mode within a short period of time, e.g., varying based on implementation circumstances, from milliseconds to minutes.

While approaches to antenna aiming can be used for providing carriers to active UEs, with idle UE 315, without the use of different approaches described herein, because the data bearer for idle UE 315 is generally released, base station 360 does not have information regarding the stage or location of idle UE 315, thus, as noted above, adjustments may not be made to facilitate connections. Without anticipatory carrier 320, when idle UE 315 is requested to transition to an active mode, the lack of anticipatory carrier 320 can cause UE attach failure and/or delay.

In contrast, in one or more embodiments, when a prediction is made (e.g., by predicting component 122) that idle UE 315 will soon transition to an active mode, anticipatory carrier 320 can be generated and directed to a predicted location of idle UE 315, e.g., based on supplemental location information (e.g., included in activation metric data 395) included in mobility update message 310. In this example, idle UE 315 provided activation metric data 395 that described associated location and signal reception information as well as other activation metric data 395 described with FIG. 4 below.

One having skill in the relevant art(s), given the description herein, appreciates different ways that the prediction described above can be generated, e.g., selecting information relevant to activation at a future time (e.g., activation metric data 395) and evaluating the information based on a model created to estimate a probability based on the relative values of the selected information. The discussion of FIG. 4 below continues this description of the predicting, including example activation metric data 395 that can be assessed by one or more embodiments.

Figure 4:
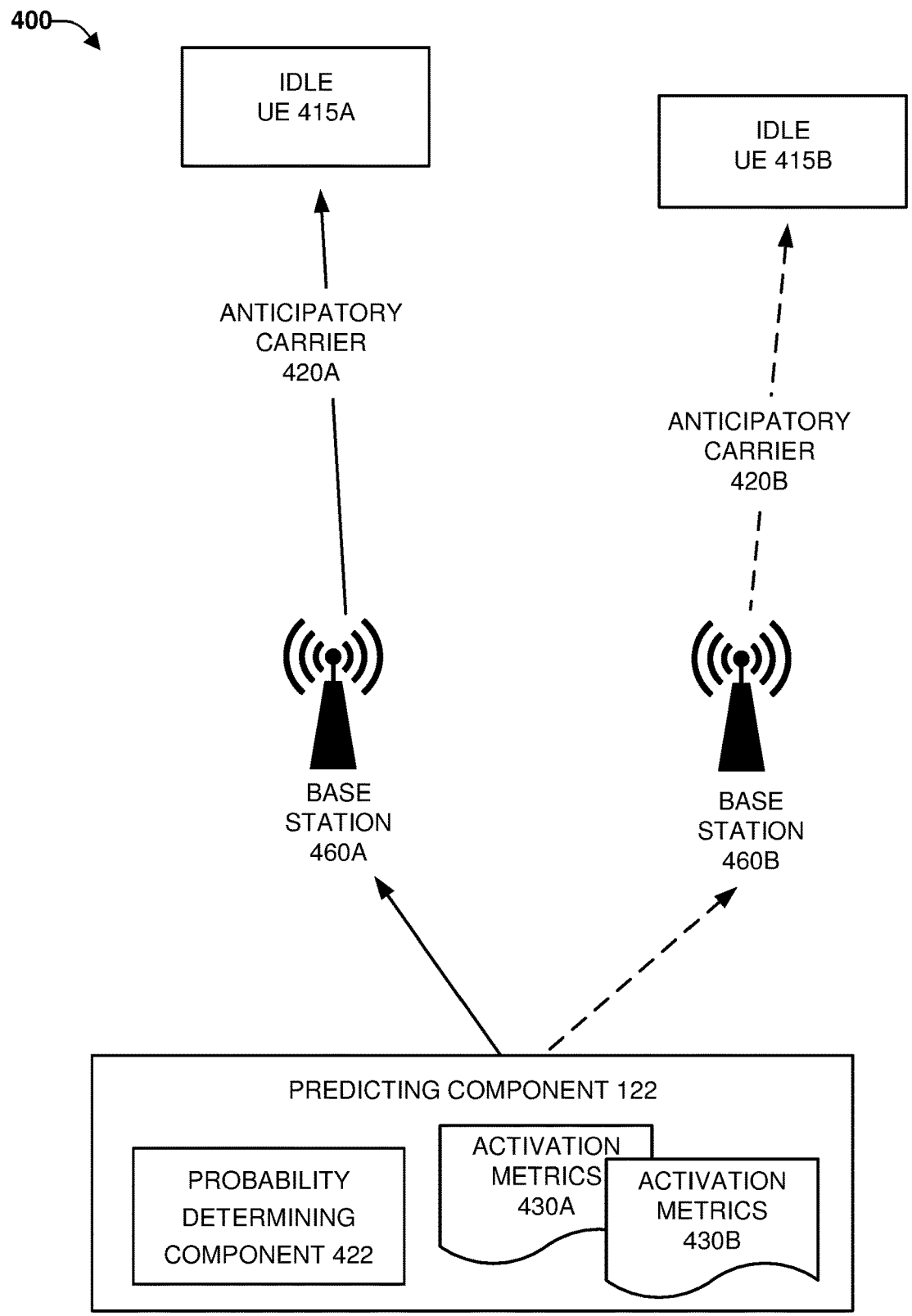
FIG. 4 is a diagram of a non-limiting example system that can facilitate, based on a prediction, providing radio resources to facilitate a predicted transition to active mode by idle user equipment, in accordance with one or more embodiments.

FIG. 4 is a diagram of a non-limiting example system 400 that can facilitate, based predicted transitions to active mode, prioritizing allocation of signal resources among different user equipment to facilitate the transition to active mode, in accordance with one or more embodiments. For purposes of brevity, description of like elements and/or processes employed in other embodiments is omitted.

As depicted, system 400 can include predicting component 122 of controller equipment 150 connected to base stations 460A-B, serving idle UEs 415A-B. To contrast different approaches to interacting with idle UEs 415A-B described herein, anticipatory carriers 420A-B are depicted. Predicting component 122 includes probability determining component 422 and stored activation metrics 430A-B that respectively apply to idle UEs 415A-B.

In one or more embodiments depicted in FIG. 4, idle UEs 415A-B are being tracked in their idle state by predicting component 122 of controller equipment 150, e.g., by processes including but not limited to, appending information relevant to activation likelihood (e.g., activation data metric 395) in periodically sent administrative messages (e.g., tracking area update message 310). One having skill in the relevant art(s), given the description herein, appreciates that idle UEs 415A-B can receive instructions to provide additional activation information within tracking area update message 310.

For example, data corresponding to UE applications in use can be analyzed as potential transition factors, e.g., after a period of time elapses in the use of a contacts application or commercial mapping application, an estimated likelihood of a voice call being sought to be initiated can be determined, or a time elapsing from the time a business mapping application is consulted. Other application usage include: chatting applications (e.g., a high likelihood that chatting will continue with an active data connection), and email applications (e.g., after a longer period of time using an email application, likelihood of another email being sent can be lower).

Other activation metric data that can be used by predicting component include historical data UEs, e.g., by analyzing patterns of UE activation and application usage, likelihoods of activation during different times of day can be predicted with more accuracy. With analysis of usage, work times, sleep times, and times where streaming data is frequently consumed can be estimated by in one or more embodiments, and these estimates can inform the predictions of predicting component 122.

Another example source of activation data that can be used independently or combined with other activation data, includes demographic data for a user of the UE, e.g., different age groups and users based in different geographic locations can have different usage patterns. Other activation metric data 395 can include and estimated location (e.g., estimated as described with FIG. 3 above), with the location of UE 315 being another factor which can be used to predict the future activation of one or both of idle UEs 415A-B.

In another example, communications traffic from the UE can be analyzed (e.g., deep packet analysis) to identify patterns of activity that can be relevant to predicting a transition to active mode by an idle UE, e.g., evidence that a UE is periodically activating to buffer streaming content can be indicative that a transition to a persistently active state (e.g., a voice call) is not imminent. One having skill in the relevant art(s), given the description herein, appreciates that different implementations can detect usage of other applications, with the usage of the application being useful without the content of the application being accessed.

In one or more embodiments, in addition to predicting a future time where one or both of idle UEs 415A-B, one or more embodiments can use probability determining component 422 to estimate a probability that a UE will become active during a period of time. This probability can then be used not only to select and prioritize UEs 415A-B for the provision of anticipatory carriers 420A-B, the probability can also be used to select an amount of resources (e.g., transmission power) that will be dedicated to anticipatory carriers 420A-B if one or both of these carriers are determined to be useful.

FIG. 5 is a diagram of a non-limiting example addendum 500 to administrative messages that can be used to allocate and direct radio resources to facilitate a predicted transition to active mode by idle user equipment, in accordance with one or more embodiments. For purposes of brevity, description of like elements and/or processes employed in other embodiments is omitted.

As depicted, an example mobility update addendum 510 can include, but is not limited to the following characteristics of signals: frequency of signal analyzed 520A, power level of signal analyzed 520B, UE calculated pathloss 520C, location of UE at sample collection 520D, current location 520E, effective isotropic radiated Power (EIRP) 520F, evolved universal terrestrial radio access network (E-UTRAN) cell global identifier (ECGI) of cell 520G, physical cell identifier (PCI) 520H, current frequency of carrier measured 520I, reference signal received power (RSRP) of serving cell, beam ID 520J, idle channel measurements from the phone 520K, power allocation setting of UE 520L, and model of UE 520M.

Figure 6:
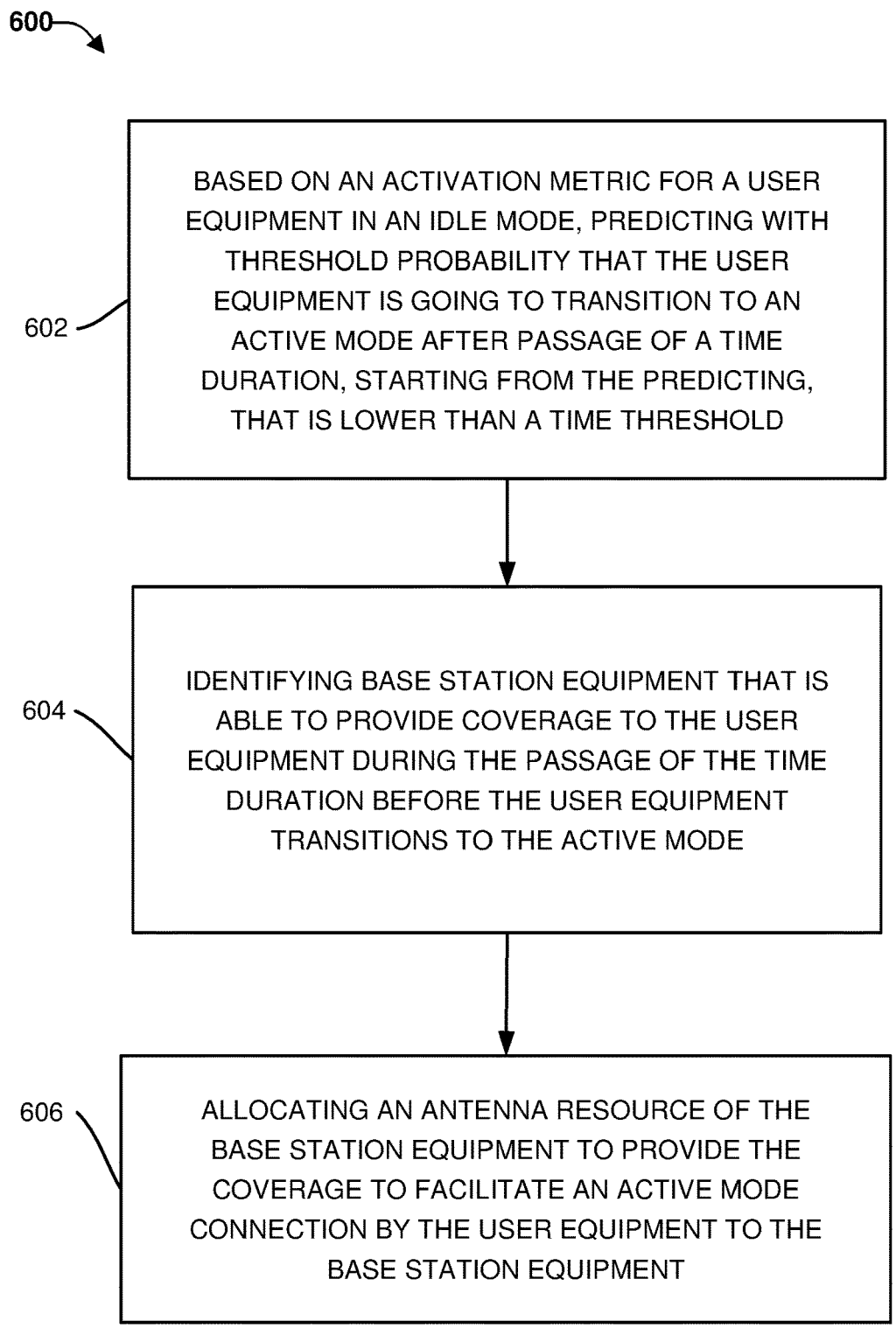
FIG. 6 illustrates an example method that can facilitate providing radio resources to facilitate a predicted transition to active mode by idle user equipment, in accordance with one or more embodiments.

FIG. 6 illustrates an example method 600 that can facilitate providing radio resources to facilitate a predicted transition to active mode by idle user equipment, in accordance with one or more embodiments. For purposes of brevity, description of like elements and/or processes employed in other embodiments is omitted. At 602, method 600 can include predicting that a user equipment in an idle mode will transition to an active mode after passage of a time duration, starting from the predicting, that is lower than a time threshold. For example, in one or more embodiments a method can include predicting that UE 515A in an idle mode will transition to an active mode after passage of a time duration, starting from the predicting, that is lower than a time threshold.

At 604, method 600 can include identifying base station equipment that is able to provide coverage to the user equipment during the passage of the time duration before the user equipment transitions to the active mode. For example, in one or more embodiments a method can include identifying base station 360 that is able to provide coverage to idle UE 515A during the passage of the time duration before the user equipment transitions to the active mode. At 606, method 600 can include prioritizing allocation of an antenna resource of the base station equipment to provide the coverage to facilitate an active mode connection by the user equipment to the base station equipment. For example, in one or more embodiments a method can include prioritizing allocation of an antenna resource (e.g., carrier 575A) of base station 360 to provide the coverage to facilitate an active mode connection by the user equipment to the base station equipment.

Figure 7:
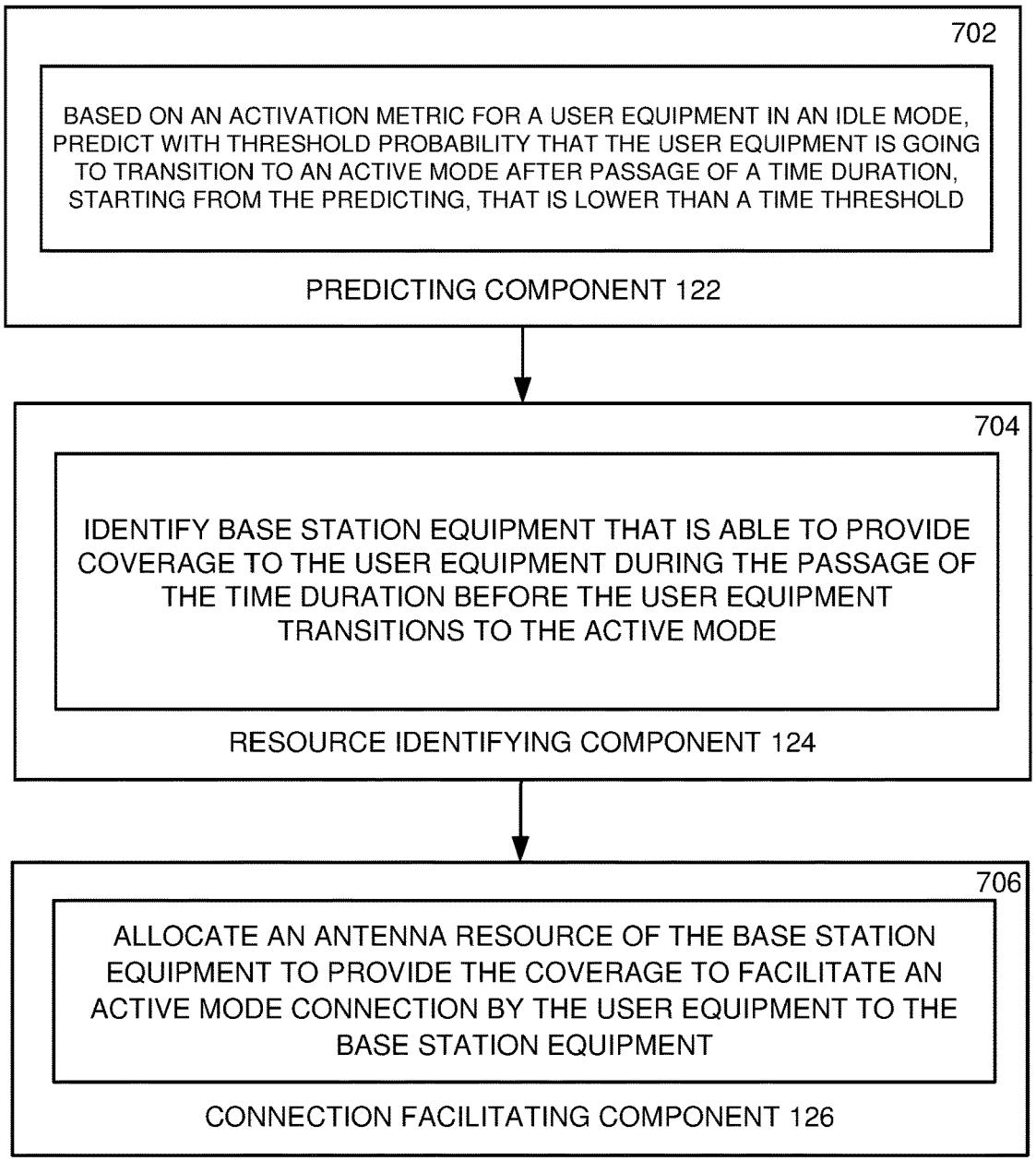
FIG. 7 depicts a system that can facilitate providing radio resources to facilitate a predicted transition to active mode by idle user equipment, in accordance with one or more embodiments.

FIG. 7 depicts a system 700 that can facilitate providing radio resources to facilitate a predicted transition to active mode by idle user equipment, in accordance with one or more embodiments. For purposes of brevity, description of like elements and/or processes employed in other embodiments is omitted. As depicted, system 700 can include predicting component 122, resource identifying component 124, connection facilitating component 126, and other components described or suggested by different embodiments described herein, that can improve the operation of system 700.

In an example, component 702 can include the functions of predicting component 122, supported by the other layers of system 700. For example, component 702 can predict that a user equipment in an idle mode will transition to an active mode after passage of a time duration, starting from the predicting, that is lower than a time threshold. For example, one or more embodiments can predict that a user equipment in an idle mode will transition to an active mode after passage of a time duration, starting from the predicting, that is lower than a time threshold. In this and other examples, component 704 can include the functions of resource identifying component 124, supported by the other layers of system 700. Continuing this example, in one or more embodiments, component 704 can identify base station equipment that is able to provide coverage to the user equipment during the passage of the time duration before the user equipment transitions to the active mode. For example, one or more embodiments can identify base station equipment that is able to provide coverage to the user equipment during the passage of the time duration before the user equipment transitions to the active mode.

In a further aspect of the example, component 706 can include the functions of connection facilitating component 126, supported by the other layers of system 700. For example, component 706 can allocate an antenna resource of the base station equipment to provide the coverage to facilitate an active mode connection by the user equipment to the base station equipment. For example, in one or more embodiments, connection facilitating component 126 of controller equipment 150 can allocate an antenna resource of the base station equipment to provide the coverage to facilitate an active mode connection by the user equipment to the base station equipment.

Figure 8:
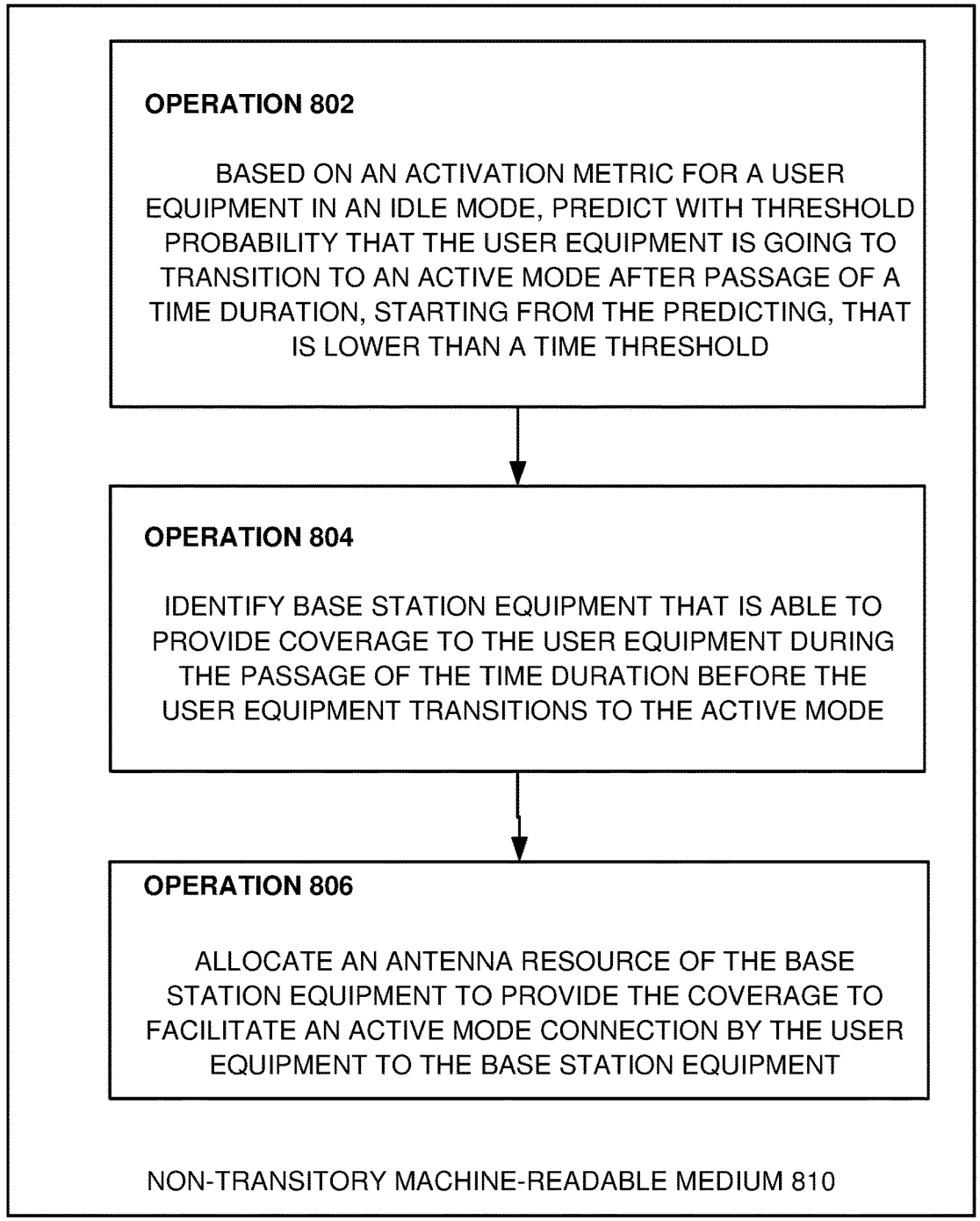
FIG. 8 depicts an example non-transitory machine-readable medium that can include executable instructions that, when executed by a processor of a system, facilitate providing radio resources to facilitate a predicted transition to active mode by idle user equipment, in accordance with one or more embodiments.

FIG. 8 depicts an example 800 non-transitory machine-readable medium 810 that can include executable instructions that, when executed by a processor of a system, facilitate providing radio resources to facilitate a predicted transition to active mode by idle user equipment, in accordance with one or more embodiments described above. For purposes of brevity, description of like elements and/or processes employed in other embodiments is omitted. As depicted, non-transitory machine-readable medium 810 includes executable instructions that can facilitate performance of operations 802-1006.

In one or more embodiments, the operations can include operation 802 that can predict that a user equipment in an idle mode will transition to an active mode after passage of a time duration, starting from the predicting, that is lower than a time threshold. For example, one or more embodiments can predict that a user equipment in an idle mode will transition to an active mode after passage of a time duration, starting from the predicting, that is lower than a time threshold.

Further, operations can include operation 804, that can identify base station equipment that is able to provide coverage to the user equipment during the passage of the time duration before the user equipment transitions to the active mode. For example, one or more embodiments can identify base station equipment that is able to provide coverage to the user equipment during the passage of the time duration before the user equipment transitions to the active mode.

In one or more embodiments, the operations can further include operation 806 that can allocate an antenna resource of the base station equipment to provide the coverage to facilitate an active mode connection by the user equipment to the base station equipment. For example, one or more embodiments can allocate an antenna resource of the base station equipment to provide the coverage to facilitate an active mode connection by the user equipment to the base station equipment.

Figure 9:
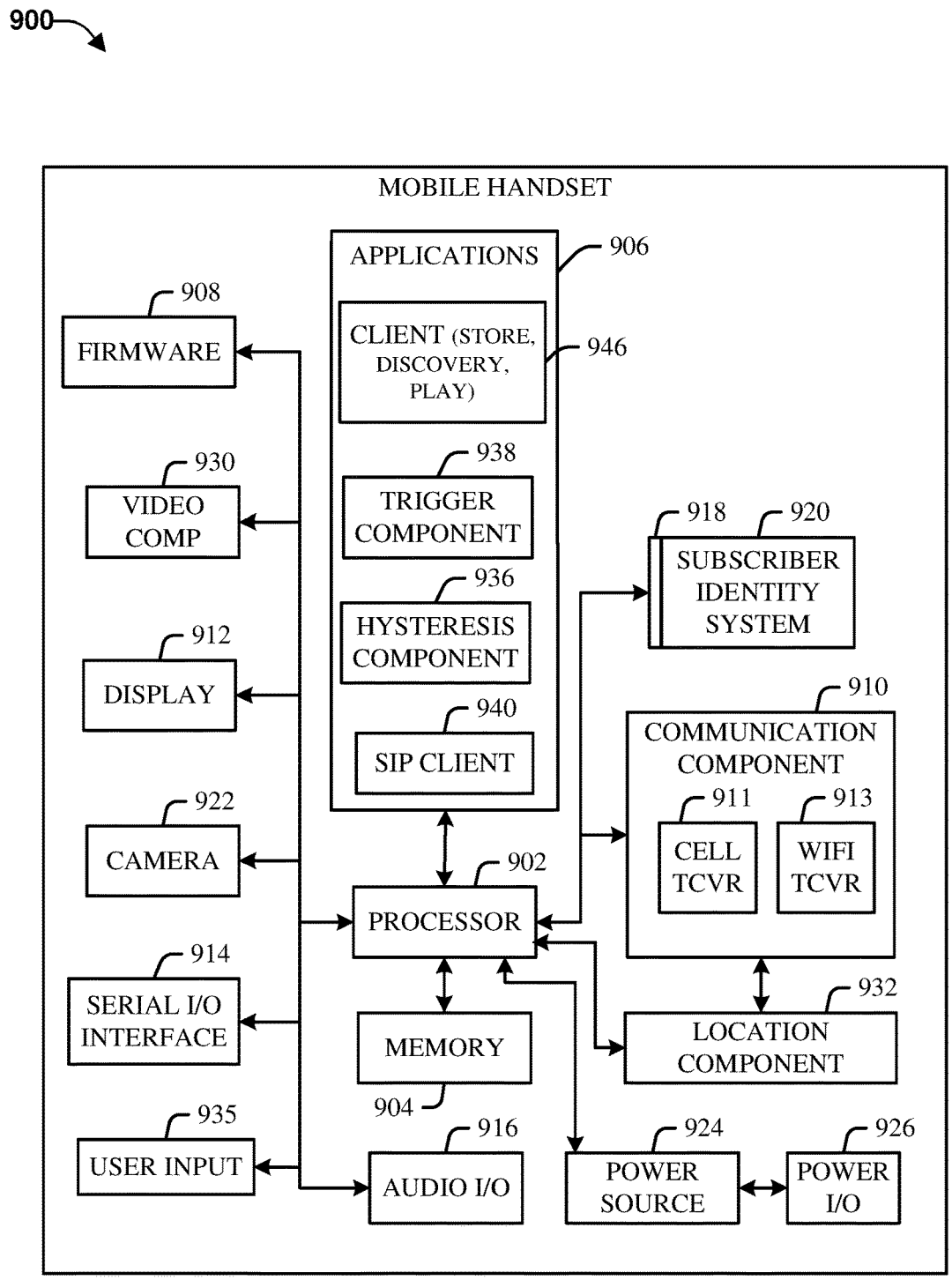
FIG. 9 illustrates an example block diagram of an example mobile handset operable to engage in a system architecture that facilitates wireless communications according to one or more embodiments described herein.

FIG. 9 illustrates an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and can include any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1294) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card SIM or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Network 190 can employ various cellular systems, technologies, and modulation schemes to facilitate wireless radio communications between devices. While example embodiments include use of 5G new radio (NR) systems, one or more embodiments discussed herein can be applicable to any radio access technology (RAT) or multi-RAT system, including where user equipment operate using multiple carriers, e.g., LTE FDD/TDD, GSM/GERAN, CDMA2000, etc. For example, wireless communication system 200 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

Various embodiments described herein can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

FIG. 11 provides additional context for various embodiments described herein, intended to provide a brief, general description of a suitable operating environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms can be used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example operating environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and a drive 1020, e.g., such as a solid-state drive, an optical disk drive, which can read or write from a disk 1022, such as a CD-ROM disc, a DVD, a BD, etc. Alternatively, where a solid-state drive is involved, disk 1022 would not be included, unless separate. While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and drive 1020 can be connected to the system bus 1008 by an HDD interface 1024, an external storage interface 1026 and a drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above, such as but not limited to a network virtual machine providing one or more aspects of storage or processing of information. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further to the description above, as it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine-readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipment do not normally connect directly to the core networks of a large service provider, but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like can be used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used, or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the embodiments are not to be limited to any single implementation, but rather are to be construed in breadth, spirit and scope in accordance with the appended claims.

What is claimed is:

1. A method, comprising:
   based on an activation metric for a user equipment of a group of user equipment in an idle mode, predicting, by a system comprising a processor, with a threshold probability that the user equipment is going to transition to an active mode after a passage of a time duration, starting from the predicting, that is lower than a time threshold;
   identifying, by the system, a base station equipment that is able to provide a coverage to the user equipment during the passage of the time duration before the user equipment transitions to the active mode; and
   prioritizing, by the system, an allocation of, within the group of user equipment, an antenna resource of the base station equipment to provide the coverage to facilitate an active mode connection by the user equipment to the base station equipment.

2. The method of claim 1, wherein the antenna resource comprises a carrier beam directed to provide the coverage to facilitate the active mode connection.

3. The method of claim 2, wherein the predicting that the user equipment is going to transition to the active mode comprises determining a probability that the user equipment is going to transition to the active mode, and comparing the probability to the threshold probability.

4. The method of claim 3, further comprising, based on the probability, selecting, by the system, a power level for the carrier beam.

5. The method of claim 3, wherein the user equipment comprises a first user equipment, and wherein the first user equipment was prioritized for allocation of the carrier beam over a second user equipment of the group of user equipment, based on the first user equipment having a higher probability of transitioning to the active mode than the second user equipment.

6. The method of claim 1, wherein the activation metric comprises a pattern of previous transitions to the active mode by the user equipment.

7. The method of claim 6, wherein the pattern of previous transitions comprises a particular time of day where previous transitions have occurred.

8. The method of claim 6, wherein the activation metric further comprises:
   packet information collected from an inspection of communication packets of the user equipment, and
   previous transitions occurring a time interval after packet information indicates that an application has been executed by the user equipment.

9. The method of claim 6, wherein the activation metric further comprises a demographic characteristic of a user identity associated with the user equipment.

10. The method of claim 6, wherein the activation metric further comprises a data analytics model generated based on user equipment activity patterns determined from previous observations of the group of user equipment.

11. The method of claim 10, wherein the time duration comprises a first time duration and the user equipment comprises a first user equipment, and wherein the predicting that the first user equipment is going to transition to the active mode after passage of the first time duration comprises predicting that the first time duration is less than a predicted second time duration for a third user equipment of the group of user equipment to transition to the active mode, resulting in a selected first user equipment, and wherein the prioritizing the allocation of the antenna resource comprises prioritizing the allocation of the antenna resource to the first user equipment based on the selected first user equipment being predicted to transition to the active mode before the third user equipment.

12. The method of claim 1, wherein the allocation of the antenna resource to provide the coverage comprises allocating the antenna resource based on available energy resources of the base station equipment.

13. The method of claim 1, wherein the identifying the base station equipment is based on feedback information from the user equipment, describing a receipt of a signal from the base station equipment at a receipt location, and wherein the signal was received while the user equipment was in the idle mode.

14. The method of claim 13, wherein the feedback information was received from the user equipment comprised in a signal propagation message that was generated by the user equipment during the idle mode.

15. The method of claim 14, wherein the signal propagation message comprises a description of a signal interference at the receipt location, and wherein the allocation of the antenna resource to facilitate the active mode connection comprises selecting the antenna resource based on the signal propagation message to mitigate the signal interference during the transition to the active mode.

16. An apparatus comprising:
  a processor; and
  a memory that stores executable instructions that, when executed by the processor, facilitate performance of operations, the operations comprising:
    based on an activation metric for a user equipment of a group of user equipment in an idle mode, predicting with a threshold probability that the user equipment is going to transition to an active mode after a passage of a time duration, starting from the predicting, that is lower than a time threshold;
    identifying a base station equipment that is able to provide a coverage to the user equipment during the passage of the time duration before the user equipment transitions to the active mode; and
    prioritizing an allocation of, within the group of user equipment, an antenna resource of the base station equipment to provide the coverage to facilitate an active mode connection by the user equipment to the base station equipment.

17. The apparatus of claim 16, wherein the antenna resource comprises a carrier beam directed to provide the coverage to facilitate the active mode connection.

18. The apparatus of claim 17, wherein the predicting that the user equipment is going to transition to the active mode comprises determining a probability that the user equipment is going to transition to the active mode, and comparing the probability to the threshold probability.

19. The apparatus of claim 18, further comprising, based on the probability, selecting, by the system, a power level for the carrier beam.

20. A non-transitory machine-readable medium comprising executable instructions that, when executed by a processor, facilitate performance of operations, the operations comprising:
  based on an activation metric for a user equipment of a group of user equipment in an idle mode, predicting with a threshold probability that the user equipment is going to transition to an active mode after a passage of a time duration, starting from the predicting, that is lower than a time threshold;
  identifying a base station equipment that is able to provide a coverage to the user equipment during the passage of the time duration before the user equipment transitions to the active mode; and
  prioritizing an allocation of, within the group of user equipment, an antenna resource of the base station equipment to provide the coverage to facilitate an active mode connection by the user equipment to the base station equipment.

* * * * *